(No Model.)
F. A. ERRINGTON.
TAPPING ATTACHMENT.
No. 578,487.    Patented Mar. 9, 1897.
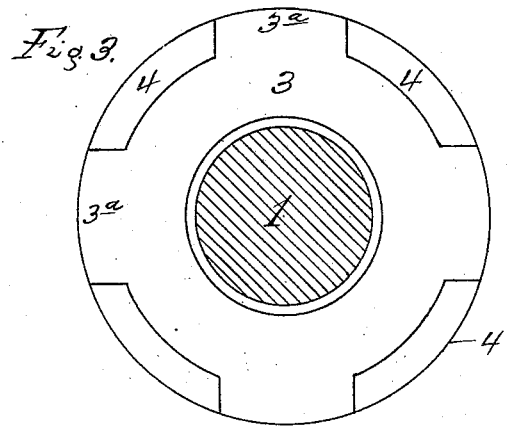
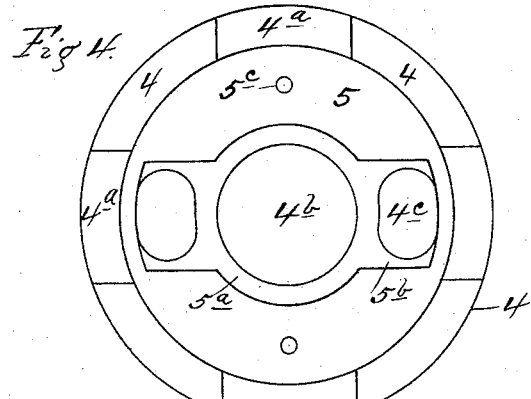
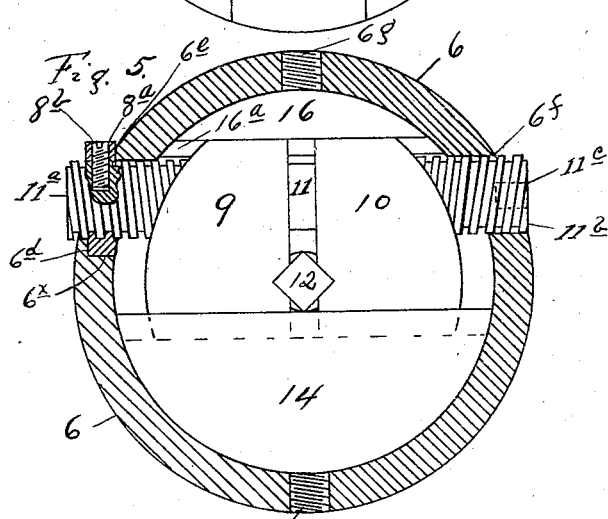
Witnesses              Inventor

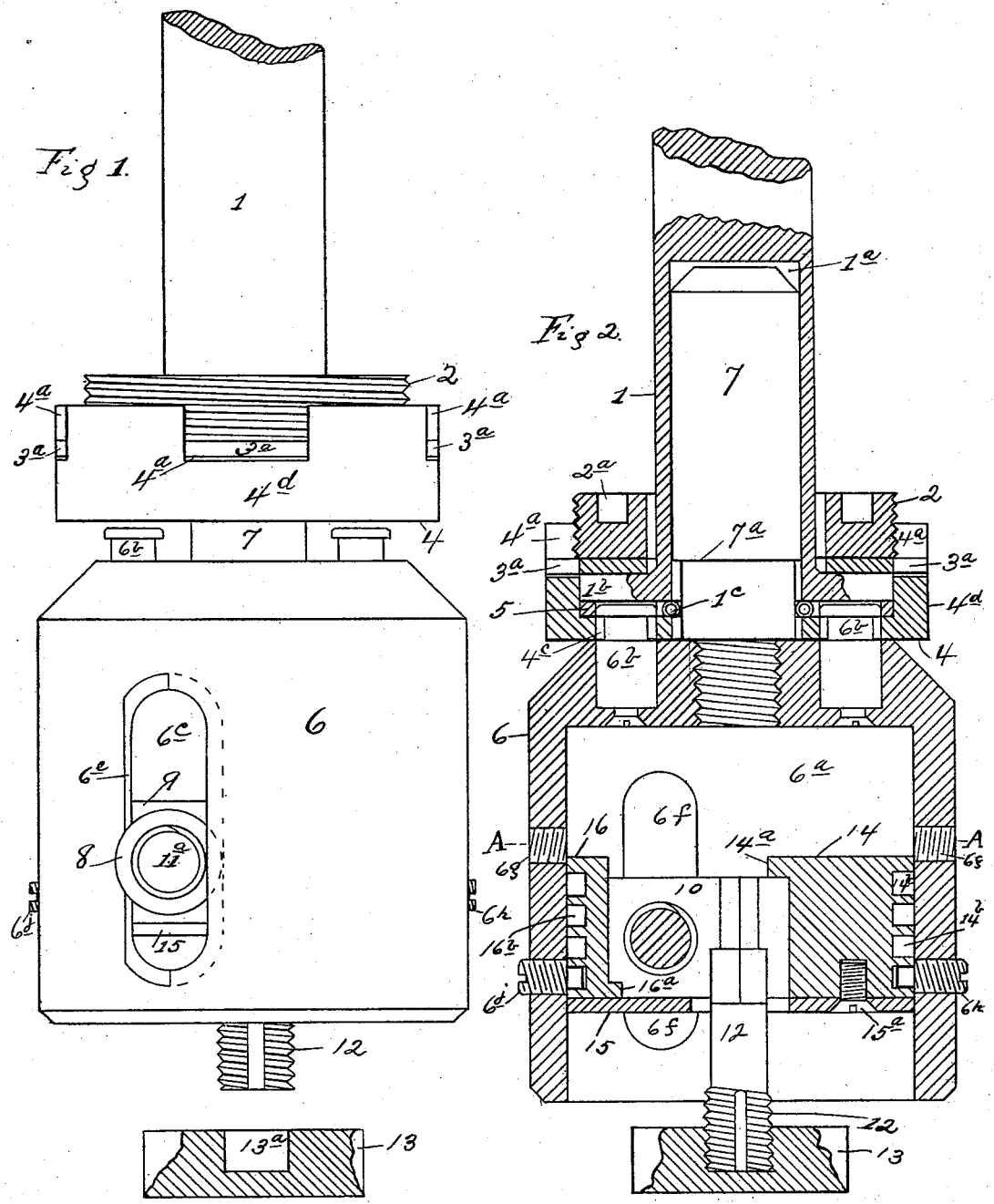

UNITED STATES PATENT OFFICE.

FRANKLIN A. ERRINGTON, OF EDGEWATER, NEW YORK.

TAPPING ATTACHMENT.

SPECIFICATION forming part of Letters Patent No. 578,487, dated March 9, 1897.

Application filed January 2, 1897. Serial No. 617,838. (No model.)

*To all whom it may concern:*

Be it known that I, FRANKLIN ALFRED ERRINGTON, a citizen of the United States, residing in the village of Edgewater, (post-office, Stapleton,) county of Richmond, and State of New York, have invented certain new and useful Improvements Relating to Tapping Attachments, of which the following is a specification.

My invention relates, broadly, to a friction driving mechanism whose adjusting members are self-locking and whose alining capacity is unaffected by the wear of the friction-disks, to novel means for connecting and disconnecting a tool-holder with a driving mechanism, and for centering and adjusting a cutting-tool therein; and to these ends the invention consists in the novel details of improvement and the combination of parts hereinafter more fully described, and then pointed out in the claims.

Reference is to be had to the accompanying drawings, forming part hereof, wherein—

Figure 1 is a side elevation of a mechanism constructed in accordance with my invention. Fig. 2 is a vertical cross-section of Fig. 1. Fig. 3 is a top view of the friction mechanism with the adjusting-ring 2 removed to show the lugs $3^a$ on the periphery of the check-washer 3. Fig. 4 is a similar view with the check-washer 3 and spindle 1 also removed to show the undercut clutch-slots of the friction-driven disk and the concentric groove for the retaining-spring formed in the friction-washer 5. Fig. 5 is a cross-section of the tool-holder on the line A A of Fig. 2.

In the application of my invention herein shown a driving-spindle 1 is provided with an axial socket $1^a$ and a flange $1^b$, the latter being utilized as a driving friction-disk. An externally-screw-threaded adjusting-ring 2 surrounds the spindle 1 and is preferably provided with two eccentrically-located parallel bores $2^a$ to afford ready connection for a wrench. A check-washer 3, having radial lugs $3^a$ projecting from its periphery, surrounds said spindle and is located between said adjusting-ring 2 and the upper surface of the driving friction disk or flange $1^b$. A friction-driven disk 4 is located on the side of the flange or disk $1^b$ that is opposite to the ring 2, and said ring 2 and disk 4 are connected by an annular wall $4^d$ through the medium of screw-threads carried by the parts 2 4. In the example shown the disk 4 and wall $4^d$ form a cup-shaped friction-driven disk which surrounds and extends under the flange $1^b$. The wall $4^d$ is provided with radial slots $4^a$ to receive the lugs $3^a$ of the check-washer 3. The disk 4 is pierced by an axial bore $4^b$, preferably of the same diameter as the socket $1^a$ of spindle 1, whereby a continuous socket $1^a 4^b$ is formed. The outer face of the disk 4 is provided with coupler-clutches, preferably shown in the form of diagonally opposite clutch-apertures $4^c$, that are located at equal distances from said axial bore $4^b$. A friction-washer 5 is preferably interposed between the opposing surfaces of the driving friction disk or flange $1^b$ and the friction-driven disk 4 and provided with an axial bore or recess $5^a$ of greater diameter than the spindle-socket $1^a$ to form a concentric groove in the walls of the socket, in which I place a retaining-spring $1^c$, which spring surrounds said socket and is extensible thereinto. The upper and lower walls of said groove hold said spring in place longitudinally. Said friction-washer 5 is also provided with two bores $5^b$, that register with but are of greater length than the clutch-aperture $4^c$ of the friction-driven disk 4 to render said coupler-clutches $4^c$ undercut on both of their driving sides or ends. (See Fig. 4.) The friction-washer 5 is held in relative position with the friction-driven disk 4 by pins $5^c$, Fig. 4.

It will be seen from the above description, first, that the adjusting members of the friction driving mechanism are rendered self-locking to preserve the tension of the frictional contact of the surfaces of the disks at the degree adjusted by the interposition of the check-washer 3; second, that I obtain the frictional surface of two friction-driven disks 3 and 4, located on opposite sides of the driving friction disk or flange $1^b$, said disks 3 4 being connected by a slip-joint $3^a 4^a$ to turn in unison and have independent longitudinal movement to and from each other, and, third, that the wear of the friction-disks does not affect the alining capacity of the socket $1^a$.

The tool-holder I have shown to be connected with the friction-driven disk 4 is preferably provided with a tubular body 6, having an axial jaw-chamber 6ᵃ. An axial shank 7 and two diagonally opposite coupler clutches or pins 6ᵇ project from the upper surface of the disk or head of the body 6, the driving-faces of said clutch-pins being preferably oppositely undercut at a right angle and said shank 7 being provided with a concentric shoulder 7ᵃ, located above the clutch-pins 6ᵇ. The axial jaw-chamber 6ᵃ is preferably provided with two alined transverse openings in its opposed side walls, one of said openings 6ᶜ being provided with a lateral recess 6ˣ, formed in its wall to receive an internally-threaded thrust-nut 8, that is provided with a plurality of transverse bores 8ᵃ. The end walls 6ᵈ 6ᵉ of said recess are preferably located on opposite sides of the opening 6ᶜ to provide a bearing for the outer face of said thrust-nut against the inner surface of the body 6, on one side at 6ᵈ, and for the inner face of said thrust-nut on the other side thereof upon the outer surface of said body 6 at 6ᵉ, to prevent end movement of said thrust-nut in said body in either direction.

9 and 10 are screw-threaded jaws the threads of which mesh with a right and left threaded screw 11. To admit the jaws 9 and 10 and screw 11 into the jaw-chamber 6ᵃ, said jaws are screwed upon the screw 11 until their opposed faces meet. One end 11ᵃ of the screw 11 is thereupon passed through the opening 6ᶜ, whose novel construction permits the screw 11 to pass through it at an angle to the centers of the opposed openings in the side walls of the body until the other end 11ᵇ of said screw can be passed through the opposite opening 6ᶠ to withdraw the end 11ᵃ from the opening 6ᶜ sufficiently to permit the thrust-nut 8 to be laterally inserted in the recess of the opening 6ᶜ between the end walls 6ᵈ 6ᵉ thereof. The thrust-nut 8 being preferably screw-threaded, said thrust-nut is preferably screwed upon the screw 11 by inserting a capstan-bar alternately in the bores 8ᵃ until the centering V's of the jaws 9 and 10 are in axial alinement with the body 6, whereupon a drill is inserted through a hole 8ᵃ in thrust-nut 8, and a hole is drilled and tapped into the screw 11, and a screw 8ᵇ is inserted therein to rigidly connect the thrust-nut 8 to turn with the screw 11. The construction of the end or centering walls of the opening 6ᶜ may be varied, and the form of the thrust-nut 8 may be correspondingly changed, and still permit said parts to coöperate to hold the screw 11 from end movement in the body 6 and permit said screw to actuate the jaws 9 and 10 universally to and from the center of the body 6.

If the openings 6ᶜ 6ᶠ were circular bores and so located that the top of the jaws 9 and 10 bore against the top of the jaw-chamber 6ᵃ when the screw 11 was in operative position in said openings 6ᶜ 6ᶠ, the jaws 9 and 10 would be held in axial alinement with the body 6 by said jaws bearing upon said top of said jaw-chamber 6ᵃ and the device would be operatively complete, the screw 11 both centering and driving a tool 12, held between the faces of the jaws 9 and 10. Furthermore, while one end 11ᵇ of the screw 11 is preferably shown provided with means to afford ready connection with a wrench, as indicated by the dotted lines 11ᶜ, it is evident that the wrench-socket 11ᶜ may be placed in the same end 11ᵃ of the screw 11 that is surrounded by the thrust-nut 8, in which case the opening 6ᶠ may be omitted, the end 11ᵇ of the screw 11 being at the same time correspondingly shortened to permit of the lateral insertion of the thrust-nut 8 between the end walls 6ᵈ 6ᵉ of its recess in the walls of the opening 6ᶜ, an alining piece 14 serving as a means to connect the jaws 9 and 10 to the body 6 to turn in unison therewith, It being desirable when drilling and then tapping a "blind hole" 13ᵃ in work 13 to use any usual means to stop the longitudinal movement of the spindle 1 to arrest the cutting of the drill at a certain depth, and as the length of the usual tap varies from that of the drill, I have devised means to adjust the cutting-tool longitudinally along the body 6. The openings 6ᶜ 6ᶠ in the side walls of the body 6 are preferably made in the form of slots of greater length in a direction parallel with the axis of the body 6 than the diameter of the screw 11 to permit said screw and jaws 9 and 10 to move longitudinally within the body 6. To retain the centering faces or V's of the jaws 9 and 10 in axial alinement with the body 6, I insert alining piece 14 between the side of the jaws 9 and 10 and the opposing wall of the jaw-chamber 6ᵃ. A lug 14ᵃ, carried by alining piece 14, overlaps the upper edge of said jaws, and a face-plate 15 incloses the lower surface of said jaws and is connected to the alining piece 14 by a screw 15ᵃ, whereby the jaws 9 and 10 are connected to move longitudinally with said alining piece 14 and to slide transversely independent thereof. To lock said centering and alining mechanism at desired intervals along the body 6, I provide indentures 14ᵇ in the periphery of the alining piece 14 and a screw-threaded hole or holes 6ᵍ in the body 6 to receive a screw or screws 6ʰ, whose inner ends project into the indentures 14ᵇ. I preferably place a similar alining piece 16 on the other side of the jaws 9 and 10 and provide it with a lug 16ᵃ to connect it in a similar manner with the jaws 9 and 10, and also provide indentures 16ᵇ to mesh with similar screws 6ʲ. By this duplication of the alining pieces I may utilize them as driving-slides, the screws 6ʰ 6ʲ relieving the clamping-screw 11 of the driving strain in either direction of rotation.

The operation of the parts is as follows: The hole 13ᵃ in the work 13 having been provided and the spindle 1 being rotated in one direction (say to the right) by any suitable means, the shank 7 is inserted in the socket 1ᵃ, its tapered end expanding the retaining-spring 1ᶜ back into the above-described concentric groove 5ᵃ, formed in the walls of said socket for its reception. The concentric shoulder 7ª is so located along the periphery of the shank 7 that it arrives above the spring 1ᶜ before the clutch-pins 6ᵇ enter the clutch apertures or bores 4ᶜ, whereupon the spring 1ᶜ contracts under said shoulder 7ª and connects the shank 7 longitudinally with the spindle 1. The tool-holder 6 is thus supported by the spindle 1, but is still out of rotary engagement therewith. Upon the spindle 1 being lowered by any suitable means the point of the tap or tool 12 will encounter the work 13, and the continued lowering and rotation of said spindle will cause the shank 7 to rise in the socket 1ª (the spring 1ᶜ slipping along the reduced diameter of the shank 7 below the collar 7ª) until the clutch-pins 6ᵇ mesh with the clutch-apertures 4ᶜ of the friction-driven disk 4, the undercut faces of the driving clutch-pins 6ᵇ overlapping the edges of the undercut clutch-apertures 4ᶜ. The tool-holder 6 is now in rotary engagement with the spindle 1 and is positively connected therewith longitudinally by the right-angular overlapping edges of the clutches above mentioned. The adjusting-ring 2 is screwed toward the friction-driven disk 4 until the tension of the frictional contact of the surfaces of the friction-disks 1ᵇ, 3, and 4 is sufficient to drive the tap 12 under usual conditions; but if the tap 12 meets with undue resistance, or when it reaches the bottom of the hole 13ª, the frictional surfaces of the disks will slide over each other and the tap will cease to rotate without danger of breakage. Upon rotating the spindle 1 in the opposite direction to that above mentioned by any suitable means the tap 12 will back out of the hole 13ª, the spindle 1 being raised as it comes out. When the end of the tap clears the work, a slight push by the operator upon the tool-holder in the same direction as it is rotating will disengage the undercut edges of the clutches, whereupon they will drop out of mesh by the action of gravity upon the tool-holder, the fall of the latter being arrested when the retaining-spring 1ᶜ engages the shoulder 7ª, whereupon the operator can freely grasp the tool-holder without danger of injury, as the tool-holder will stand still in his hand, although the spindle 1 continues to rotate independently, the spring 1ᶜ slipping freely in its recess. The operator can then pull the shank 7 entirely from the socket 1ª and insert, say, a drill-holder for the next hole.

It is obvious that the construction of the parts may be varied from that shown and still secure the improved functional results of my invention.

Having now described my invention, what I claim is—

1. The combination of a driving friction-disk, a spindle projecting therefrom, a screw-threaded adjusting-ring surrounding said spindle, a check-washer interposed between said adjusting-ring and said driving friction-disk, and a friction-driven disk located on the other side of said driving friction-disk and provided with screw-threads to mesh with the screw-threads of said adjusting-ring, said check-washer and said friction-driven disk being connected together to turn in unison by a slip-joint whereby said last-named parts can have independent longitudinal movement toward and from each other, substantially as described.

2. The combination of a driving friction-disk, a spindle projecting therefrom, a screw-threaded adjusting-ring surrounding said spindle, a check-washer interposed between said adjusting-ring and said driving friction-disk and provided with a lug upon its periphery, a cup-shaped friction-driven disk having a slot in its side wall to receive the lug of said check-washer and also having screw-threads to mesh with the screw-threads of said adjusting-ring, substantially as described.

3. The combination of a spindle having a flange and an axial socket, a disk connected with said flange, said disk having an axial bore and being provided with a coupler-clutch, and another disk having an axial shank to enter said socket and a coupler-clutch to engage said coupler-clutch of said disk, substantially as described.

4. The combination of a spindle having a flange and an axial socket, a disk connected with said flange and having an axial bore that registers with said socket, said parts having an axial recess of greater diameter than said axial socket and located between their opposed surfaces, a retaining-spring located in said recess and extensible into said socket, said disk having an eccentrically-located coupler-clutch, and another disk having an axial shank to enter said socket and a coupler-clutch to engage the sides of said coupler-clutch, substantially as described.

5. The combination of two disks, one of said disks being provided with a coupler-clutch having opposite sides oppositely undercut at a right angle, and the other of said disks having a coupler-clutch provided with correspondingly undercut clutch-faces, the distance between said clutch-faces of the second-mentioned coupler-clutch being greater than the distance between the undercut edges of said first-mentioned coupler-clutch, to enable the latter to pass between said clutch-faces, substantially as described.

6. The combination of two screw-threaded jaws, a tubular body surrounding said jaws and having an opening in its side wall, a right and left threaded screw meshing with said jaws and having a portion located in said opening, means to prevent end movement of said screw in said body, and means to retain the opposed faces of said jaws parallel with the axis of said body, substantially as described.

7. The combination of two screw-threaded jaws, a tubular body surrounding said jaws and having an opening in its side wall, a right and left threaded screw meshing with said jaws and having a portion located in said opening, a thrust-nut located in said opening and connected with said screw to resist end movement thereof, said body being provided with means to prevent end movement of said thrust-nut in either direction, and means to retain the opposed faces of said jaws parallel with the axis of said body, substantially as described.

8. The combination of two screw-threaded jaws, a tubular body surrounding said jaws and having an opening in its side wall, a right and left threaded screw meshing with said jaws and having a portion located in said opening, a thrust-nut attached to said screw to turn therewith and journaled in said opening, the outer face of said thrust-nut having a bearing against the inner surface of said body and the inner face of said thrust-nut having a bearing against the outer surface of said body, to prevent end movement of said screw in said body in either direction, and means to retain the opposed faces of said jaws parallel with the axis of said body, substantially as described.

9. The combination of two screw-threaded jaws, a tubular body surrounding said jaws and having an opening in its side wall, a right and left threaded screw having a portion located in said opening, a thrust-nut attached to said screw to turn therewith and journaled in said opening, the wall of said opening being indented by a lateral recess in which is located said thrust-nut and which recess has end walls that hold said thrust-nut from end movement in either direction, and means to retain the opposed faces of said jaws parallel with the axis of said body, substantially as described.

10. The combination of two screw-threaded jaws, a tubular body surrounding said jaws and having an opening in its side wall, a right and left threaded screw meshing with said jaws and having a portion located in said opening, means to prevent end movement of said screw in said body, and an alining piece located between said jaws and the inner wall of said body and connected with said body to rotate in unison therewith, substantially as described.

11. The combination of a tubular body, a centering and alining mechanism surrounded by and longitudinally movable along said body, and means to connect said mechanism to said body to rotate in unison therewith, substantially as described.

12. The combination of two screw-threaded jaws, a tubular body surrounding said jaws, a right and left threaded screw meshing with said jaws, said jaws and screw being longitudinally movable along and connected to said body to rotate in unison therewith, and means to center and aline said screw and jaws in said body, substantially as described.

13. The combination of two screw-threaded jaws, a tubular body surrounding said jaws, a right and left threaded screw meshing with said jaws, said jaws and screw being connected to rotate in unison with and being longitudinally movable along said body, means to center and aline said screw and jaws in said body, and means to lock said jaws to said body to prevent said longitudinal movement, substantially as described.

14. The combination of two screw-threaded jaws, a tubular body surrounding said jaws, a right and left threaded screw meshing with said jaws, said jaws and screw being longitudinally movable along and connected to said body to rotate in unison therewith, means to prevent end movement of said screw in said body, and an alining piece, said jaws being connected with said alining piece to move longitudinally therewith and to slide transversely independently thereof, said alining piece and said body having the one an indenture or indentures and the other a projection or projections to mesh with said indenture or indentures to lock said alining piece to said body at certain intervals along the length thereof, substantially as described.

15. The combination of two screw-threaded jaws, a tubular body surrounding said jaws and having an opening in its side wall, a right and left threaded screw meshing with said jaws and having a portion located in said opening, the length of said opening in a direction parallel with the axis of said body being greater than the diameter of said screw to permit said screw and jaws to move longitudinally along said body, said body being provided with means to prevent end movement of said screw in either direction, and means to retain the opposed faces of said jaws parallel with the axis of said body, substantially as described.

F. A. ERRINGTON.

Witnesses:
S. E. ROBERTS,
B. O. BOGERT.